(12) United States Patent
Lee et al.

(10) Patent No.: US 12,061,785 B2
(45) Date of Patent: Aug. 13, 2024

(54) FLEXIBLE ELECTRONIC DEVICE FOR DISPLAYING BASED ON TYPE OF CONTENT

(71) Applicant: LG ELECTRONICS INC., Seoul (KR)

(72) Inventors: Ju Hye Lee, Seoul (KR); Shin Hui Ahn, Seoul (KR); Eui Taek Oh, Seoul (KR); Sang Young Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 17/789,681

(22) PCT Filed: Dec. 31, 2019

(86) PCT No.: PCT/KR2019/018789
§ 371 (c)(1),
(2) Date: Jun. 28, 2022

(87) PCT Pub. No.: WO2021/137321
PCT Pub. Date: Jul. 8, 2021

(65) Prior Publication Data
US 2023/0051784 A1 Feb. 16, 2023

(51) Int. Cl.
*G06F 3/04842* (2022.01)
*G06F 3/0489* (2022.01)
*H04M 1/02* (2006.01)

(52) U.S. Cl.
CPC ........ *G06F 3/04842* (2013.01); *G06F 3/0489* (2013.01); *H04M 1/0268* (2013.01);
(Continued)

(58) Field of Classification Search
CPC ............... G06F 3/04842; G06F 3/0489; G06F 2203/04803; G06F 2203/04804; H04M 1/0268; H04M 1/0241; H04M 1/0235
See application file for complete search history.

(56) References Cited

U.S. PATENT DOCUMENTS

2013/0122960 A1   5/2013   Kim et al.
2015/0278990 A1*  10/2015  Lee .................... G06F 3/048
                                                       345/665
(Continued)

FOREIGN PATENT DOCUMENTS

KR   10-2013-0053766 A    5/2013
KR   10-2016-0125272 A    10/2016
(Continued)

OTHER PUBLICATIONS

Mitsuyama, "Luminance Adjusting Device, Luminance Adjusting Method and Luminance Adjusting Program" (English Translation of 2010070721) (Year: 2010).*
(Continued)

*Primary Examiner* — John T Repsher, III
(74) *Attorney, Agent, or Firm* — Birch, Stewart, Kolasch & Birch, LLP

(57) ABSTRACT

According to an example embodiment of the present disclosure, an electronic device includes a display that is flexible, has at least a portion located at a first side of the electronic device, and is changeable in size to which the display is exposed to the first side, and a controller configured to display content related to a first application in a first area of the display and display content related to a second application in a second area of the display, wherein when an event related to a notification is identified, the controller displays content related to the notification on one area determined from the first area and the second area based on at least one of the content related to the first application and the content related to the second application.

14 Claims, 12 Drawing Sheets

(52) U.S. Cl.
CPC .............. *G06F 2203/04803* (2013.01); *G06F 2203/04804* (2013.01)

(56) References Cited

U.S. PATENT DOCUMENTS

| | | | |
|---|---|---|---|
| 2015/0287389 A1* | 10/2015 | Mese ....................... | G09G 5/10 |
| | | | 345/207 |
| 2015/0363064 A1 | 12/2015 | Kobayashi et al. | |
| 2016/0370864 A1* | 12/2016 | Choi ..................... | G06F 3/0481 |
| 2016/0378270 A1 | 12/2016 | Lee et al. | |
| 2017/0244809 A1* | 8/2017 | Chae ................... | H04L 41/0869 |
| 2017/0344253 A1* | 11/2017 | Zhang ............... | H04M 1/72484 |
| 2022/0086798 A1* | 3/2022 | Zhang ............... | H04M 1/72403 |

FOREIGN PATENT DOCUMENTS

| | | | | |
|---|---|---|---|---|
| KR | 10-2017-0000553 A | 1/2017 | | |
| KR | 10-2017-0025952 A | 3/2017 | | |
| WO | WO-2010070721 A1 * | 6/2010 | .............. | G09G 5/10 |
| WO | WO 2016/171433 A1 | 10/2016 | | |
| WO | WO-2020037611 A1 * | 2/2020 | ........... | G06F 3/0481 |

OTHER PUBLICATIONS

Liu, "Method and Electronic Device for Processing Notification Message" (English Translation of 2020037611) (Year: 2020).*

* cited by examiner

FLEXIBLE ELECTRONIC DEVICE FOR DISPLAYING BASED ON TYPE OF CONTENT

CROSS REFERENCE TO RELATED APPLICATION

This application is the National Phase of PCT International Application No. PCT/KR2019/018789, filed on Dec. 31, 2019, which is hereby expressly incorporated by reference into the present application.

TECHNICAL FIELD

This disclosure relates to an electronic device for displaying content related to at least one application and a control method thereof, and one particular implementation relates to a method of displaying content based on a type of application-related content and an electronic device using the method.

BACKGROUND ART

Advances of network technologies and expansions of infrastructures have enabled an electronic device to perform various tasks. With such technological advances, it is required to perform various tasks simultaneously using a plurality of applications in parallel in a certain situation.

To use the plurality of applications in parallel, the electronic device may display content related to each of the applications on a display. For example, the electronic device may display content related to a first application including a multimedia playing function and content related to a second application including a messenger function on the display.

In this case, the content related to the first application continuously provides visual information, so that a user may continuously use the content. In addition, the content related to the second application may be used by the user at a point in time corresponding to transmission and reception of a message.

A difference between such ways of use may be based on a type of content related to an application. Accordingly, for easier and more convenient use of the electronic device, the type of content related to the application may be taken into consideration. In other words, there is a desire for a method for appropriately providing a user interface based on a type of content related to an application.

DISCLOSURE OF INVENTION

Technical Goals

An aspect provides an electronic device that displays predetermined content based on a type of application-related content or determines a style of displaying the application-related content so that the application-related content is more easily used and a control method of the electronic device.

Technical goals of the present disclosure are not limited as mentioned above and, although not mentioned, may include goals that can be clearly understood by those skilled in the art to which the present disclosure pertains, from the following description.

Technical Solutions

According to an aspect, there is provided an electronic device including a display that is flexible, has at least a portion located at a first side of the electronic device, and is changeable in size to which the display is exposed to the first side, and a controller configured to display content related to a first application in a first area of the display and display content related to a second application in a second area of the display, wherein when an event related to a notification is identified, the controller is configured to display content related to the notification on one area determined from the first area and the second area based on at least one of the content related to the first application and the content related to the second application.

According to another aspect, there is also provided a control method of an electronic device including a display that is flexible, has at least a portion located at a first side of the electronic device, and is changeable in size to which the display is exposed to the first side, the control method including displaying content related to a first application in a first area of the display and displaying content related to a second application in a second area of the display and displaying, when an event related to a notification is identified, content related to the notification on one area determined from the first area and the second area based on at least one of the content related to the first application and the content related to the second application.

Effects

According to example embodiments, it is possible to provide an electronic device that displays predetermined content based on a type of application-related content or determines a style of displaying the application-related content so that the application-related content is more easily used and a control method of the electronic device.

Further, according to example embodiments, it is possible to provide application-related content in a form more convenient for use based on a type of the application-related content.

Effects are not limited to the aforementioned effects, and other effects not mentioned will be clearly understood by those skilled in the art from the description of the claims.

BEST MODE FOR CARRYING OUT THE INVENTION

Figure 1:
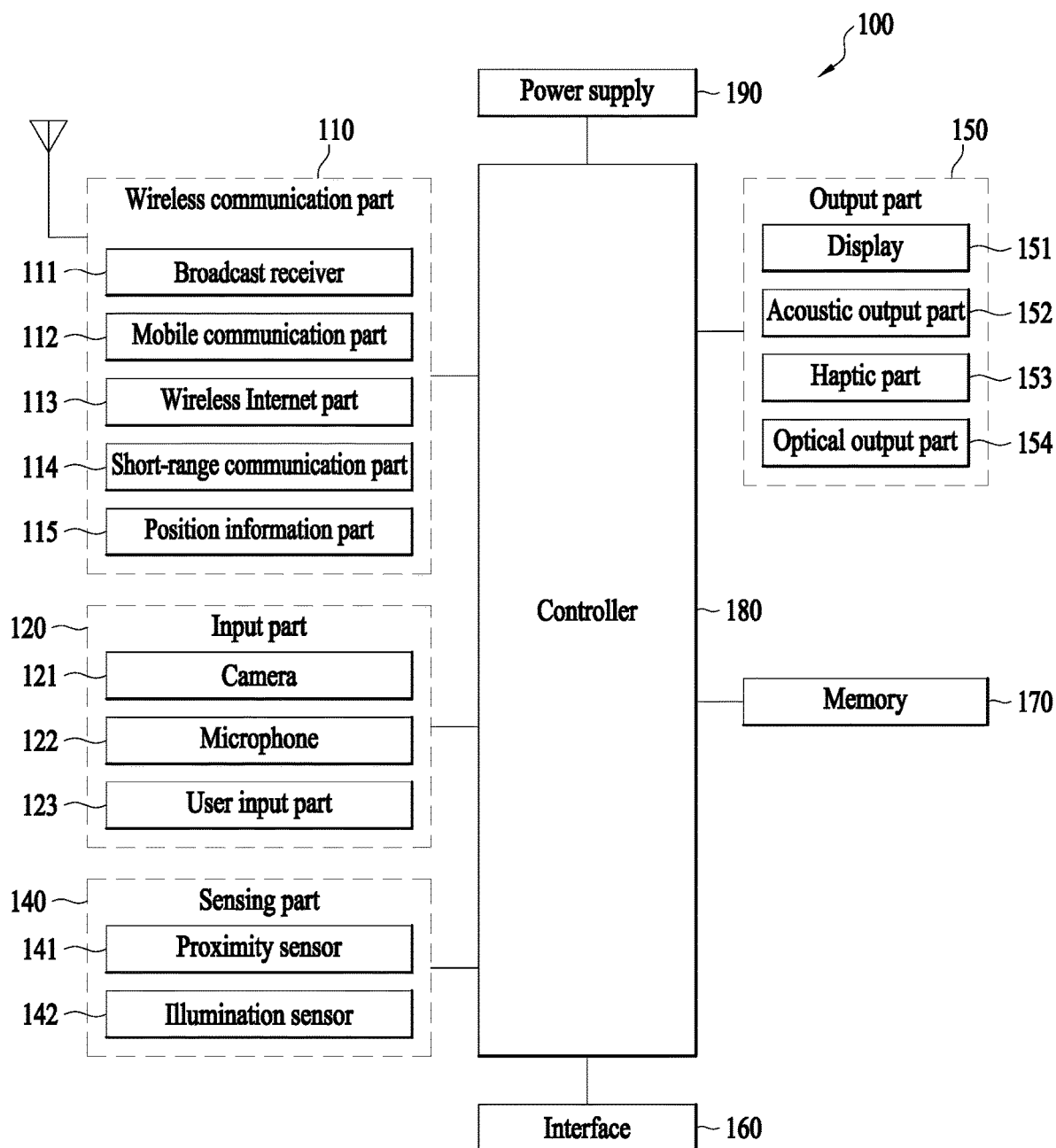
FIG. 1 is a block diagram illustrating an electronic device related to the present disclosure.

Hereinafter, example embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known arts will be omitted when it is deemed that such description will cause ambiguous interpretation of the present disclosure. In addition, the accompanying drawings are only for easy understanding of the embodiments disclosed in the present specification, and the technical ideas disclosed in the present specification are not limited by the accompanying drawings. Also, it should be understood to cover all modifications, equivalents, and alternatives falling within the spirit and scope of the present specification.

Although terms such as "first" and "second" may be used herein to describe various elements, these elements are not to be limited by these terms. Rather, these terms are only used to distinguish one element from another element.

When an element is described as being "connected to" or "coupled to" another element, it may be directly "connected to" or "coupled to" the other element, or there may be other elements intervening therebetween. In contrast, when an element is described as being "directly connected" or "directly coupled to" another element, there can be no other elements intervening therebetween.

The singular forms are intended to include the plural forms as well, unless the context clearly indicates otherwise.

In the present specification, it will be further understood that the terms "comprises" or "includes", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram illustrating an electronic device (or a mobile terminal) 100 related to an example embodiment of the present disclosure.

An electronic device 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic device, so the electronic device 100 described herein may have more or fewer components than those listed above.

Specifically, the wireless communication part 110 may include at least one module that enables wireless communication to be performed between the electronic device 100 and a wireless communication system, between the electronic device 100 and another electronic device 100, or between the electronic device 100 and an external server. The wireless communication part 110 may include one or more modules that connect the electronic device 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the electronic device 100, surrounding environment information of the electronic device 100, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the electronic device 100 may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic device 100 and a user and simultaneously, provide an output interface between the electronic device 100 and the user.

The interface 160 may function as a passage to various types of external devices connected to the electronic device 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic device 100 may perform an appropriate control associated with the connected external device.

The memory 170 may store data supporting various functions of the electronic device 100. The memory 170 may store application programs (or applications) run in the electronic device 100, data for operation of the electronic device 100, and instructions. At least a portion of the application programs may be downloaded from an external server through wireless communication. Also, at least a portion of the application programs may exist in the electronic device 100 for a basic function (for example, call forwarding and outgoing function and message receiving and outgoing function) of the electronic device 100 from the time of manufacture. The application program may be stored in the memory 170, installed in the electronic device 100, and run by the controller 180 to perform an operation (or function) of the mobile terminal.

The controller 180 may generally control an overall operation of the electronic device 100 in addition to operations related to the application programs. The controller 180 may process a signal, data, information, and the like input or output through the aforementioned components or run the application program stored in the memory 170, thereby providing information to a user or performing appropriate information or function.

In addition, to run the application program stored in the memory 170, the controller 180 may control at least a portion of the components shown in FIG. 1. Furthermore, to run the application program, the controller 180 may operate a combination of two or more components among the components included in the electronic device 100.

The power supply 190 may supply power to each component included in the electronic device 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the electronic device 100 according to various embodiments as described below. In addition, the operation, control, or control method of the electronic device 100 may be implemented on the electronic device 100 through an execution of at least one application program stored in the memory 170.

In the present disclosure, the electronic device 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic device 100 may include a deformation detection part that detects a deformation of the flexible display. The deformation detection part may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection part, the controller 180 may change information displayed on the flexible display or generate a control signal for controlling functions of the electronic device 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise stated.

Figure 2:
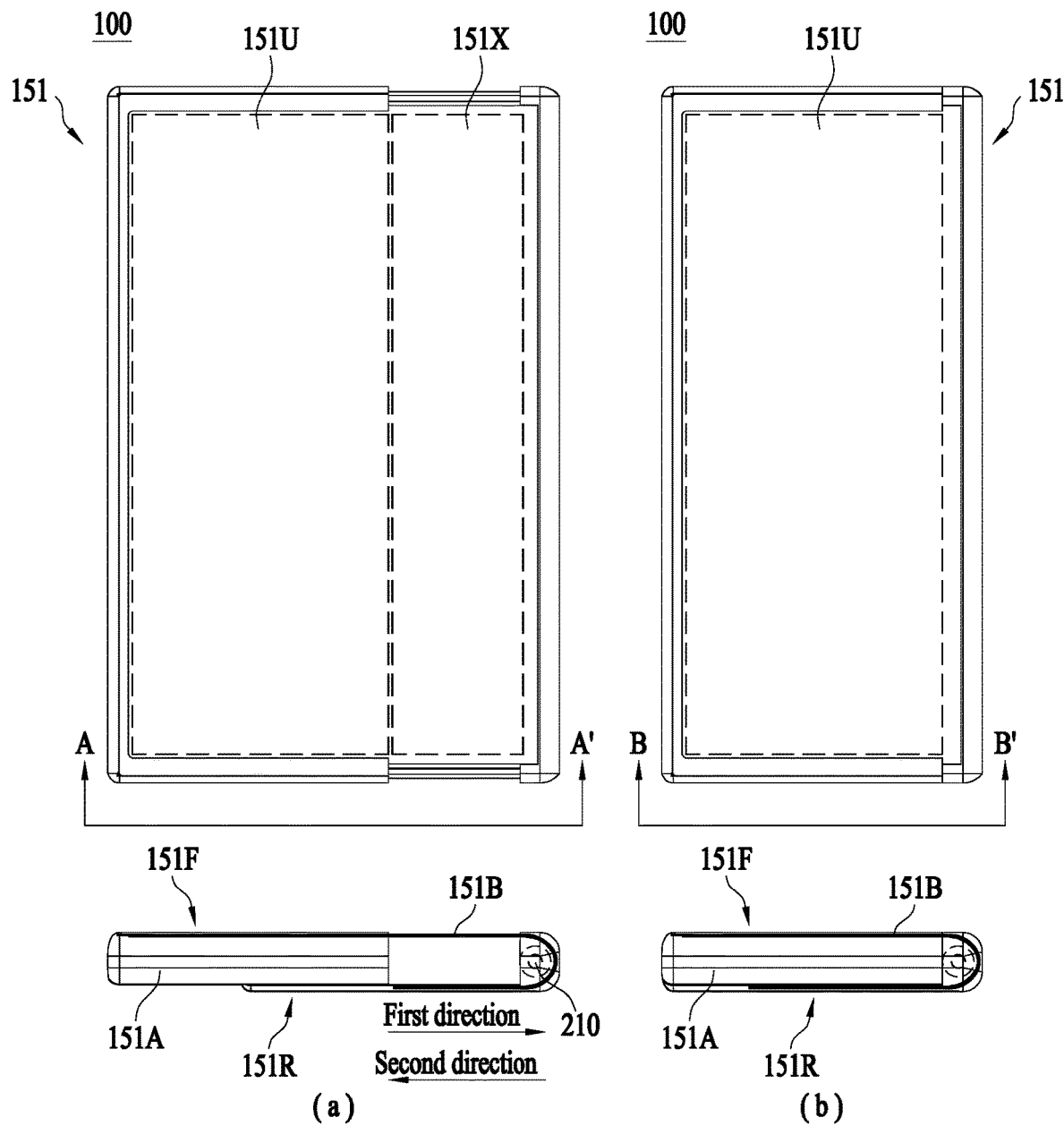
FIGS. 2 and 3 illustrate views obtained before and after an expansion of a display of an electronic device related to the present disclosure.
Figure 3:
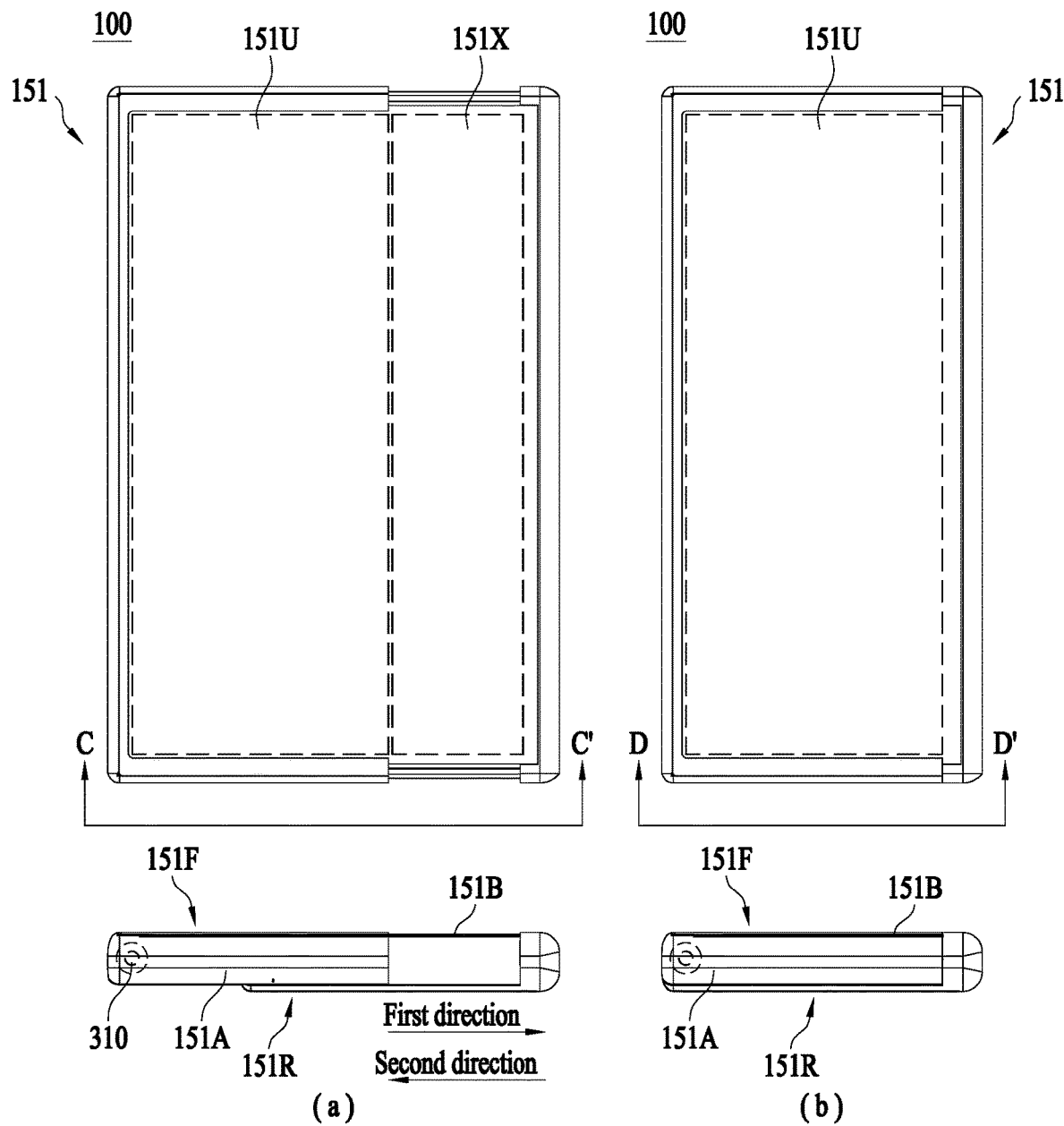

FIGS. 2 and 3 are conceptual diagrams illustrating states before and after a display 151 of the electronic device 100 is expanded according to an example embodiment of the present disclosure.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) in FIG. 2 illustrates the electronic device 100 with the display 151 which is extended, and (b) in FIG. 2 illustrates the electronic device 100 with the display 151 which is not extended.

Referring to FIG. 2, the display 151 may have one side fixed at a front surface with reference to the electronic device 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state in which the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed to the front surface. When the second frame 151B slidably moves in a direction opposite to the first direction to be retracted toward the first frame 151A, the front region 151F of the display 151 may be reduced as well, causing only the fixed part 151U to remain exposed to the front surface.

The rear region of the display 151 may be exposed to a rear surface of the second frame 151B. The rear region of the display 151 may be covered by a light-transmitting rear window and therefore visible from the outside.

Meanwhile, the front region 151F of the display 151 may be exposed to a front surface without an additional window. In some cases, however, a deco frame may cover a boundary region between the front region 151F and the first frame 151A, thereby preventing an external material and covering a bezel region of the electronic device to help visibility of a screen for a user.

An electronic part may be formed in an inner surface formed by external structures such as the first frame 151A and the second frame 151B. An electronic component for driving the electronic device 100, such as a battery 191, may be mounted at a main printed circuit board (PCB) and thus provided in the electronic part. Alternatively, an electronic component such as an internal antenna module may be mounted directly at the electronic part rather than mounted at the main PCB.

In an example embodiment, the electronic device 100 may include a driving part for controlling a size of the display 151. The driving part may be implemented, for example, using a motor. The electronic device 100 may control a size of the display 151 by controlling a moving direction of the first direction edge 210 of the display 151 using a motor.

Specifically, (a) of FIG. 3 illustrates an electronic device 100 with a display 151 which is extended, and (b) of FIG. 3 illustrates the electronic device 100 with the display 151 which is not extended.

Referring to FIG. 3, the display 151 may have one side fixed at a front region with reference to the electronic device 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain at the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
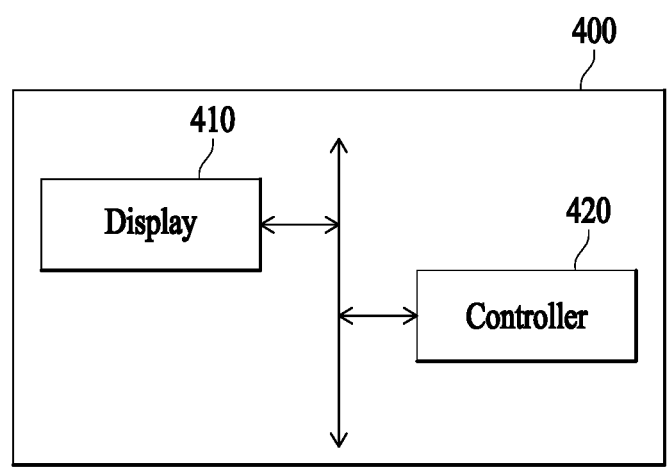
FIG. 4 is a functional block diagram illustrating an electronic device according to an example embodiment of the present disclosure.

FIG. 4 is a functional block diagram illustrating an electronic device according to an example embodiment of the present disclosure. In the following description, an element of the electronic device 400 may indicate a unit that processes at least one function or operation, and may be implemented as hardware or software, or a combination of hardware and software.

Referring to FIG. 4, an electronic device 400 may include a display 410 and a controller 420.

The display 410 may be disposed to be changeable in size to which the display 410 is exposed to a first side (e.g., a front surface of the electronic device 400) of the electronic device 400. The display 410 may be implemented to be flexible.

The display 410 may display various information associated with an operation of the electronic device 400. The various information may include, for example, content related to an application executed in the electronic device 400.

In the example embodiment, a portion of the display 410 may be located at the first side and another portion may be wound at one side of the electronic device 400 so as to be located at a second side of the electronic device 400. Here, the second side may include a rear surface that faces the first side in the electronic device.

Specifically, the display 410 may be bent at one end adjoining the first side such that at least a portion of the display 410 is located at the first side and at least another portion is located at the second side adjoining the one end. Meanwhile, since the related description has been made with reference to FIG. 2 or 3, repeated descriptions will be omitted.

The controller 420 may display content related to a first application in a first area of the display 410 and display content related to a second application in a second area of the display 410.

In the example embodiment, the first area and the second area may be included in an area of the display 410 exposed to the first side (e.g., a front surface of the electronic device 400). However, it is merely an example, and in some cases, the first area may be included in the area of the display 410 exposed to the first side and the second area may be included in an area of the display 410 exposed to a second side (e.g., a rear surface of the electronic device 400).

When a notification-related event is identified, the controller 420 may display notification-related content in at least one of the first area and the second area based on at least one of the content related to the first application and the content related to the second application.

In the example embodiment, the controller 420 may identify the notification-related event. The notification-related event may include an event triggering displaying of the notification-related content on the display 410. For example, the notification-related event may include an event of receiving a message from another electronic device or an event of creating a notification from an application installed in the electronic device 400. Also, in the example embodiment, as to the notification, an application corresponding to the notification may be present. In response to an input corresponding to the notification-related content, content related to the application corresponding to the notification may be displayed on the display 410.

In the example embodiment, the controller 420 may identify the content related to the first application and the content related to the second application. Specifically, the controller 420 may identify a type of each of the content related to the first application and the content related to the second application.

As an example, a content type may include a viewing type. Content of the viewing type may require a continuous appreciation for colorful images and when a background has a low brightness, may include content with improved effects of information recognition or content to be displayed in a full screen mode. Content of the viewing type may include, for example, video content, image content, or game content. In the example embodiment, when the content of the viewing type is provided, the notification may be displayed in an area other than an area in which the content of the viewing type is provided.

As another example, a content type may include a reading type such as a text. Content of the reading type may require clear recognition of the text and when a background has a high brightness, may include content with improved effects of information recognition. In the example embodiment, when the content of the reading type is provided, the notification may be displayed in an area in which the content of the reading type is provided.

As still another example, a content type may include a listening type such as music. Content of the listening type may be content having a main function of playing a specific sound, and a form of the content displayed on the display 410 may be irrespective of the main purpose of the content of the listening type, that is, listening to a sound. In the example embodiment, when the content of the listening type is provided, the notification may be displayed in an area in which the content of the listening type is provided.

However, the present examples are not to be taken as being limited thereto, and the contents may be classified into various types based on a way of using the content.

In the example embodiment, when the content related to the first application includes content of a predetermined type, the controller 420 may display the notification-related content in the second area. Here, the second area may include an area in which the content related to the second application is displayed on the display 410. In addition, the predetermined type may include the viewing type.

In this case, providing the notification-related content may not interrupt an appreciation based on the content related to the first application, so that a user may more easily use the content.

The controller 420 may display the notification-related content based on setting information. Here, the setting information may include information previously set based on a user input, and a related description will be made with reference to FIG. 6.

In the example embodiment, when the setting information corresponds to a first setting, the controller 420 may display the notification-related content in one area determined from the first area and the second area based on at least one of the content related to the first application and the content related to the second application.

Here, the first setting may include a setting to display the notification-related content based on a type of application-related content. Specifically, the first setting may include a setting to display the notification-related content in an area in which content having a type other than the viewing type is displayed.

In this case, when the content related to the first application includes the content of the viewing type, the controller 420 may display the notification-related content in the second area in which the content related to the second application is displayed.

In the example embodiment, when the setting information corresponds to a second setting, the controller 420 may display the notification-related content at a position corresponding to the second setting. The second setting may include a setting to display the notification-related content in an area corresponding to a predetermined position.

In this case, when the notification-related event is identified, the controller 420 may display the notification-related content in the area corresponding to the predetermined position.

In the example embodiment, the controller 420 may receive an input corresponding to the notification-related content. The input corresponding to the notification-related content may include, for example, a touch input on the notification-related content. In this case, the controller 420 may display content corresponding to an application related to the notification in at least a portion of the area corresponding to the notification-related content.

For example, when the input corresponding to the notification-related content is received, the controller 420 may display content indicated by the notification. If the notification-related content is displayed in the second area in which the content related to the second application is displayed, the controller 420 may display the content indicated by the notification in at least a portion of the second area in response to the input being received. As such, by adjusting an area for displaying the notification-related content based on the type of the content displayed on a screen, it is possible to increase a concentration of the appreciation of the predetermined content (e.g., the content of the viewing type). In addition, an area for displaying the content related to the application corresponding to the notification may be adjusted to use an application corresponding to the notification while appreciating the predetermined content.

In the example embodiment, the controller 420 may determine a style of displaying each of the content related to the first application and the content related to the second application. Specifically, the controller 420 may determine a style of displaying the application-related content to be a style designated based on the type of the application-related content.

For example, when the content related to the first application is a content of a first type, the controller 420 may determine the style to be a first style. Here, the first type may be the viewing type, and the first style may include a dark mode in which at least one of a brightness and a chroma of an area related to the content is adjusted to decrease. When the content related to the second application is a content of a second type, the controller 420 may determine the style to be a second style. Here, the second type may be the viewing type, and the second style may include a light mode in which at least one of a brightness and a chroma of the area related to the content is adjusted to increase. A displaying style is not limited to the examples, and changing a displayed form while maintaining the content may be included in a style change.

In this case, depending on an example embodiment, the first area in which the content related to the first application is displayed and the second area in which the content related to the second application is displayed may have different styles. Meanwhile, the dark mode and the light mode may have predetermined brightness values, and a related example will be described in detail with reference to FIG. 9.

In the example embodiment, the controller 420 may change a style of displaying the content related to the second application according to the content related to the first application and according to the content related to the second application.

Specifically, when a type of the content related to the first application corresponds to the first type (e.g., the viewing type), the controller 420 may determine the style of displaying the content related to the second application to be the first style (e.g., the dark mode). When the style of displaying the content related to the second application differs from the first style, the controller 420 may change the style of displaying the content related to the second application to be the first style.

In some cases, when the type of the content related to the first application corresponds to the first type, the controller 420 may determine the style of each of the content related to the first application and the content related to the second application to be the first style.

Depending on an example embodiment, when displaying the first application is suspended, the content related to the first application may be changed to content related to a third application in response to the third application being displayed. The controller 420 may determine a style of displaying the content related to the third application based on a type of the content related to the third application.

In such cases, the controller 420 may identify the style of displaying the content related to the second application based on the style of displaying the content related to the third application. The controller 420 may change the style of displaying the content related to the second application to correspond to the style of displaying the content related to the third application.

In the example embodiment, the controller 420 may determine the style of displaying the content related to the first application and the content related to the second application based on a user input. For example, the controller 420 may identify a user input for selecting one of the content related to the first application and the content related to the second application. The controller 420 may identify a content type corresponding to the identified input. The controller 420 may determine the style of displaying the content related to the first application and the content related to the second application to be a style corresponding to the identified type.

In the example embodiment, the controller 420 may determine a style of displaying at least one of the content related to the first application and the content related to the second application based on style setting information.

For example, when the style setting information includes the first style, the controller 420 may determine the style of displaying each of the content related to the first application and the content related to the second application to be the light mode. When the style setting information includes the second style, the controller 420 may determine the style of displaying each of the content related to the first application and the content related to the second application to be the dark mode. When the style setting information includes a third style, the controller 420 may determine the style of displaying the content related to the first application or the content related to the second application based on the content type. Since the example of the third style has been described in detail above, repeated descriptions are omitted.

The controller 420 may receive an input related to an input UI. The input related to the input UI may include an input for triggering the input UI to be displayed, for example, a touch input of touching a text input window.

When the input is received, the controller 420 may identify a type of content related to the received input from the content related to the first application and the content related to the second application. For example, when the received input is related to the content related to the first application, the controller 420 may identify the type of the content related to the first application.

When the identified type corresponds to the first type (e.g., the viewing type), the controller 420 may display an input UI having a transparency of a predetermined value or more on the display 410. When the identified type corresponds to the second type (e.g., the reading type), the controller 420 may display an input UI having a transparency less than the predetermined value on the display 410. In addition, in the example embodiment, the transparency at the input UI is displayed may correspond to an application type.

Here, as the value of the transparency increases, the transparency at which the input UI is displayed may increase. In other words, through the input UI having the transparency of the predetermined value or more, UIs arranged to overlap behind may be more clearly seen as compared to the input UI having the transparency less than the predetermined value.

In the example embodiment, the controller 420 may verify whether to display the input UI having the transparency of the predetermined value or more based on a user's setting input related to the input UI. For example, the controller 420 may provide a window showing "Use a transparent keyboard?" through the display 410. Based on an input for this, the controller 420 may verify whether to display the input UI having the transparency of the predetermined value or more. A related example will be described in detail with reference to FIG. 10.

In the example embodiment, the controller 420 may display one of the content related to the first application and the content related to the second application. In this case, the controller 420 may determine whether to display the input UI having the transparency of the predetermined value or more based on a type of content displayed. When the type of the displayed content is the first type, the controller 420 may determine the input UI having the transparency of the predetermined value or more to be displayed. A related example will be described in detail with reference to FIG. 11.

In the example embodiment, when the input related to the input UI is received, the controller 420 may identify an area in which the input UI is to be displayed on the display 410. The controller 420 may identify a type of content displayed in the identified area, and when the type of the content corresponds to the first type, may display the input UI having the transparency of the predetermined value or more.

Figure 5:
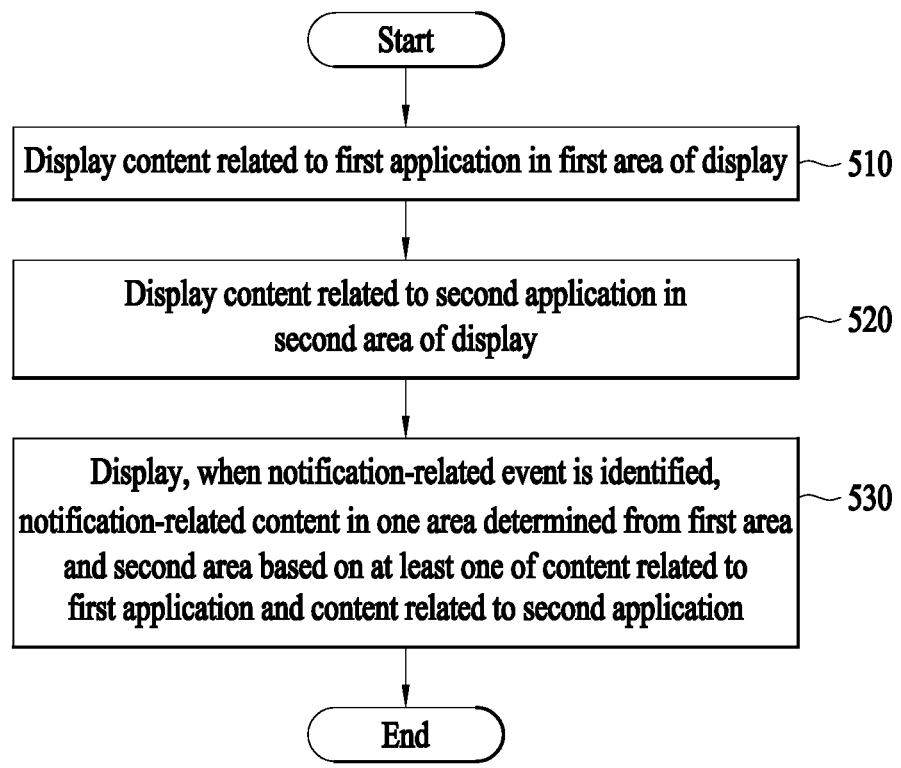
FIG. 5 is a flowchart illustrating operations of a method of controlling an electronic device according to an example embodiment of the present disclosure.

FIG. 5 is a flowchart illustrating a control method of an electronic device according to an example embodiment of the present disclosure. As would be apparent to one skilled in the art, in some cases, operations of FIG. 5 may be performed in a different order from that shown in the drawing.

Referring to FIG. 5, in operation 510, the electronic device may display content related to a first application in a first area of a display. In operation 520, the electronic device may display content related to a second application in a second area of the display. Operations 510 and 520 may be performed in parallel or irrespective of an order depending on an example embodiment.

The first area and the second area may correspond to at least a portion of the display exposed to a first side (e.g., a front surface) of the electronic device. However, it is merely an example, and the second area may correspond to, for example, at least a portion of the display located at a second side (e.g., a rear surface) of the electronic device.

The electronic device may identify a notification-related event. The notification-related event may include, for example, an event related to notification of information received from another electronic device or notification of information generated by the electronic device.

When the notification-related event is identified, in operation 530, the electronic device may display the notification-related content in one area determined from the first area and the second area based on at least one of the content related to the first application and the content related to the second application.

Specifically, when the notification-related event is identified, the electronic device may identify a content type of each of the content related to the first application and the content related to the second application.

Here, as an example, a content type may include a viewing type such as a video or an image. Content of the viewing type may require a continuous appreciation for colorful images and when a background has a low brightness, may include content with improved effects of information recognition. As another example, a content type may include a reading type such as a text or a listening type such as music. Content of the reading type may require clear recognition of the text and when a background has a high brightness, may include content with improved effects of information recognition. Content of the listening type may include content having a main function of playing a specific sound. However, the present examples are not to be taken as being limited thereto, and the content may be classified into various types based on a way of using the content.

When the content related to the first application corresponds to a first type (e.g., the viewing type), and when the content related to the second application corresponds to a second type (e.g., the reading type), the electronic device may display the notification-related content in the second area.

In the example embodiment, the electronic device may determine a display style based on the type of at least one of the content related to the first application and the content related to the second application. The display style may be, for example, a style in which the content related to the first application or the content related to the second application is represented on the display, and may include, for example, a style related to a brightness or color.

As an example, when the type of at least one of the content related to the first application and the content related to the second application corresponds to the first type (e.g., the viewing type), the electronic device may determine a style of displaying the content related to the first application and the content related to the second application to be a first style (e.g., a dark mode).

As another example, when the type of at least one of the content related to the first application and the content related to the second application corresponds to the second type (e.g., the reading type), the electronic device may determine a style of displaying the content related to the first application and the content related to the second application to be a second style (e.g., a light mode).

As still another example, when the type of the content related to the first application corresponds to the first type, and the type of the content related to the second application corresponds to the second type, the electronic device may determine a style based on a type of content related to a most recently received input. In this example, when the content related to the most recently received input is the content related to the first application, the electronic device may determine a style of displaying the content related to the first application and the content related to the second application to be the first style.

In some cases, the electronic device may set the styles of the content related to the first application and the content related to the second application independently based on the types of the contents. In such cases, a style of the first area in which the content related to the first application is displayed may be distinguished from a style of the second area in which the content related to the second application is displayed.

In the example embodiment, the electronic device may identify content related to an input UI (e.g., keyboard) from the content related to the first application and the content related to the second application. The electronic device may determine a transparency of the input UI based on a type of content related to the input UI and display the input UI based on the determined transparency.

For example, when an input for triggering the input UI is received in an area in which the content related to the first application is displayed, the electronic device may identify the type of content related to the first application. When the type of content related to the first application is the first type (e.g., the viewing type), the electronic device may display an input UI having a transparency of a predetermined value or more. When the type of content related to the first application is the second type (e.g., the reading type), the electronic device may display an input UI having a transparency less than the predetermined value.

Figure 6:
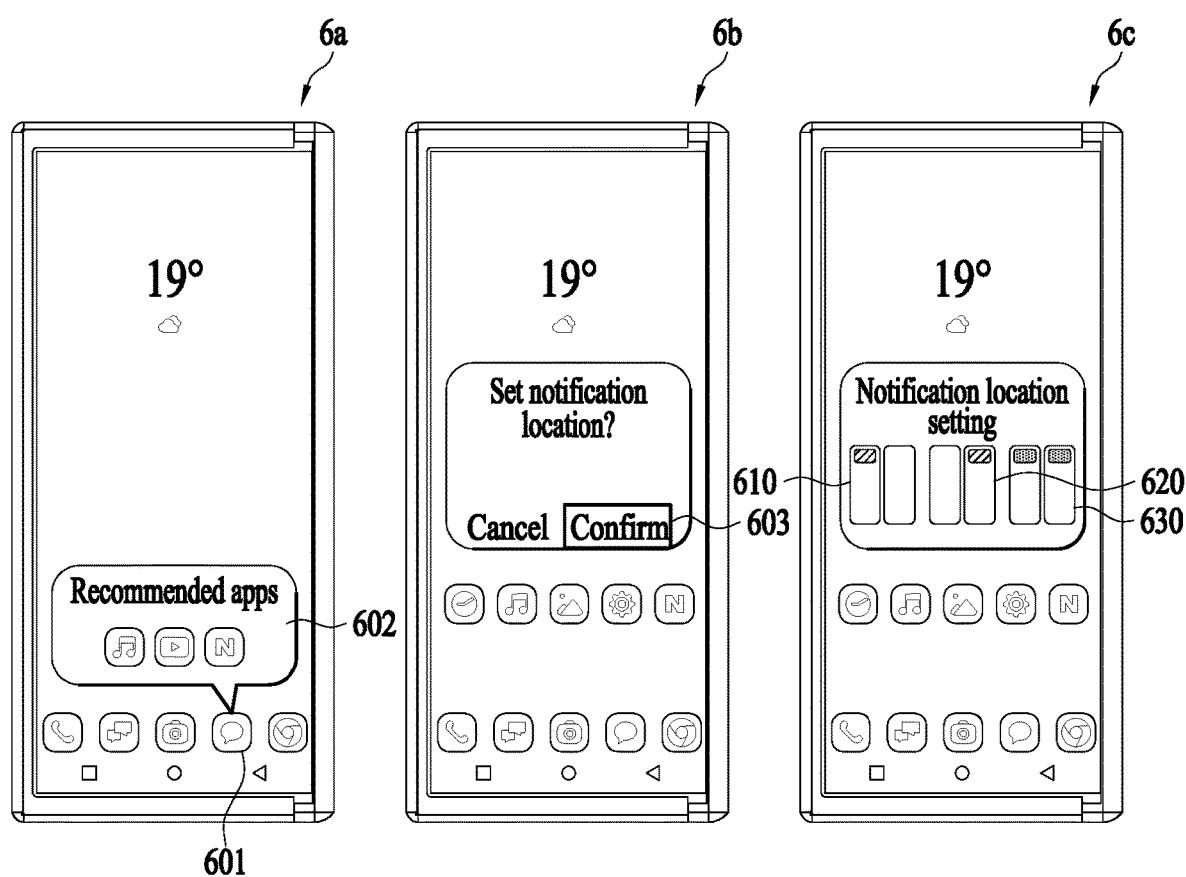
FIG. 6 is a diagram illustrating an example of a setting screen for content related to a notification in an electronic device according to an example embodiment of the present disclosure.

FIG. 6 is a diagram illustrating an example of a setting screen for content related to a notification in an electronic device according to an example embodiment of the present disclosure.

Reference numeral 6a indicates a selecting window 602 for selecting a second application to be displayed in parallel with a first application 601 in response to a predetermined input being applied to the first application 601. As illustrated, the selecting window 602 may include information (e.g., an icon) on an application that recommends displaying in parallel with the first application 601.

When the second application to be displayed along with the first application 601 is determined based on the input to the selecting window 602, a screen may be provided as indicated by reference numeral 6b.

The reference numeral 6b may indicate a screen that requests a verification whether to set an area for displaying notification-related content among content related to the first application 601 and content related to the second application. When an input to a confirm icon 602 is received, a screen may appear as indicated by reference numeral 6c.

According to the reference numeral 6c, the electronic device may provide information on a plurality of examples, that is, a first setting 610, a second setting 620, and a third setting 630, for setting a position in which the notification-related content is to be displayed. Here, the first setting 610 may include a setting for displaying the notification-related content in a first area. The second setting 620 may include a setting for displaying the notification-related content in a second area. The third setting 630 may include a setting for displaying the notification-related content in the first area or the second area based on a type of content related to each of the first area and the second area.

When an input corresponding to one of the first setting 610, the second setting 620, and the third setting 630 is received, the electronic device may determine how to display the notification-related content based on a setting corresponding to the received input.

Figure 7:
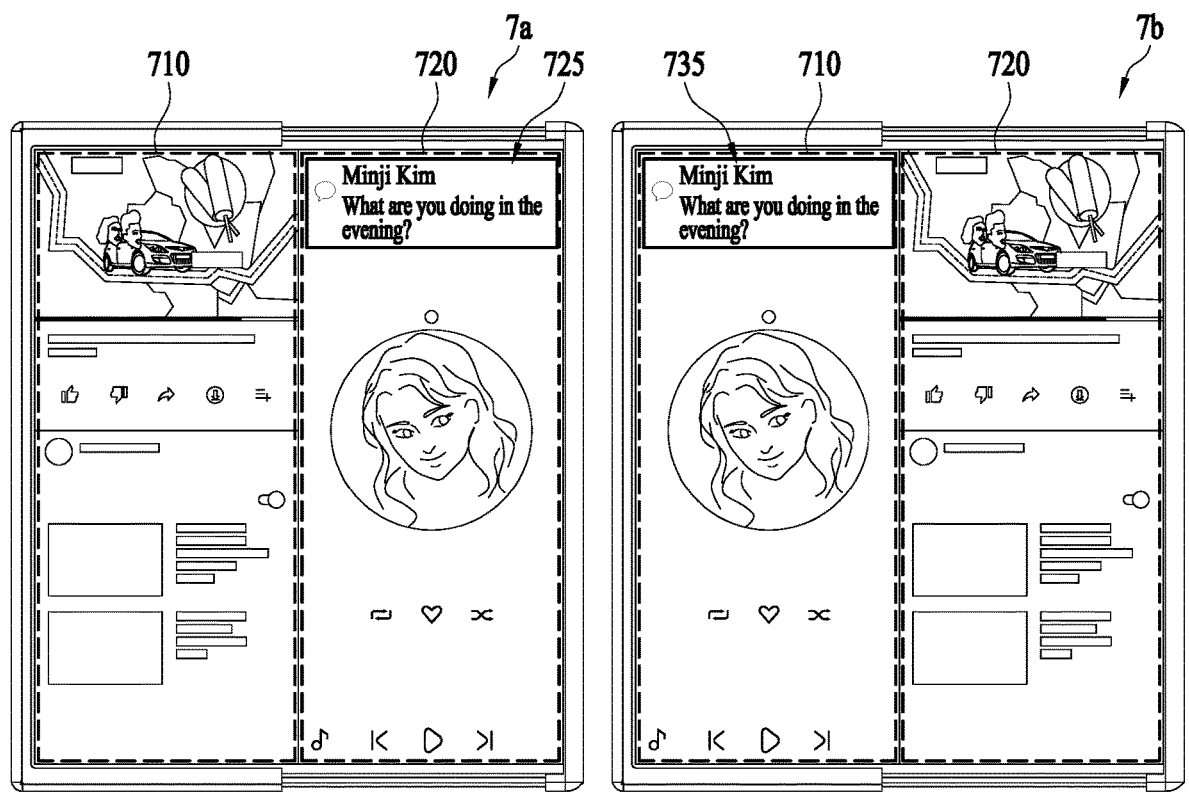
FIG. 7 is a diagram illustrating an example of displaying content related to a notification on an electronic device according to an example embodiment of the present disclosure.

FIG. 7 is a diagram illustrating an example of displaying content related to a notification on an electronic device according to an example embodiment of the present disclosure. Specifically, FIG. 7 illustrates an example of displaying notification-related content based on a type of content related to a first area 710 or a second area 720 in response to the third setting of FIG. 6 being selected.

Reference numeral 7a indicates an example of displaying content (e.g., content related to a first application) of a first type (e.g., a viewing type) in the first area 710 and displaying content (e.g., content related to a second application) of a second type (e.g., a listening type) in the second area 720. Here, the content of the first type may be video content of the viewing type and the content of the second type may be music content of the listening type. In this case, notification-related content 725 may be displayed in at least a portion of the second area 720.

Reference numeral 7b indicates an example of displaying the content of the second type in the first area 710 and displaying the content of the first type in the second area 720. In this case, notification-related content 735 may be displayed in at least a portion of the first area 710.

Although FIG. 7 illustrates a case in which the content related to the first application and the content related to the second application are displayed on a display exposed to the first side of the electronic device, this is merely an example. The example embodiment of the present disclosure may also be applicable to, for example, a case in which the content related to the first application is displayed on the first side of the electronic device and the content related to the second application is displayed on the second side.

Figure 8:
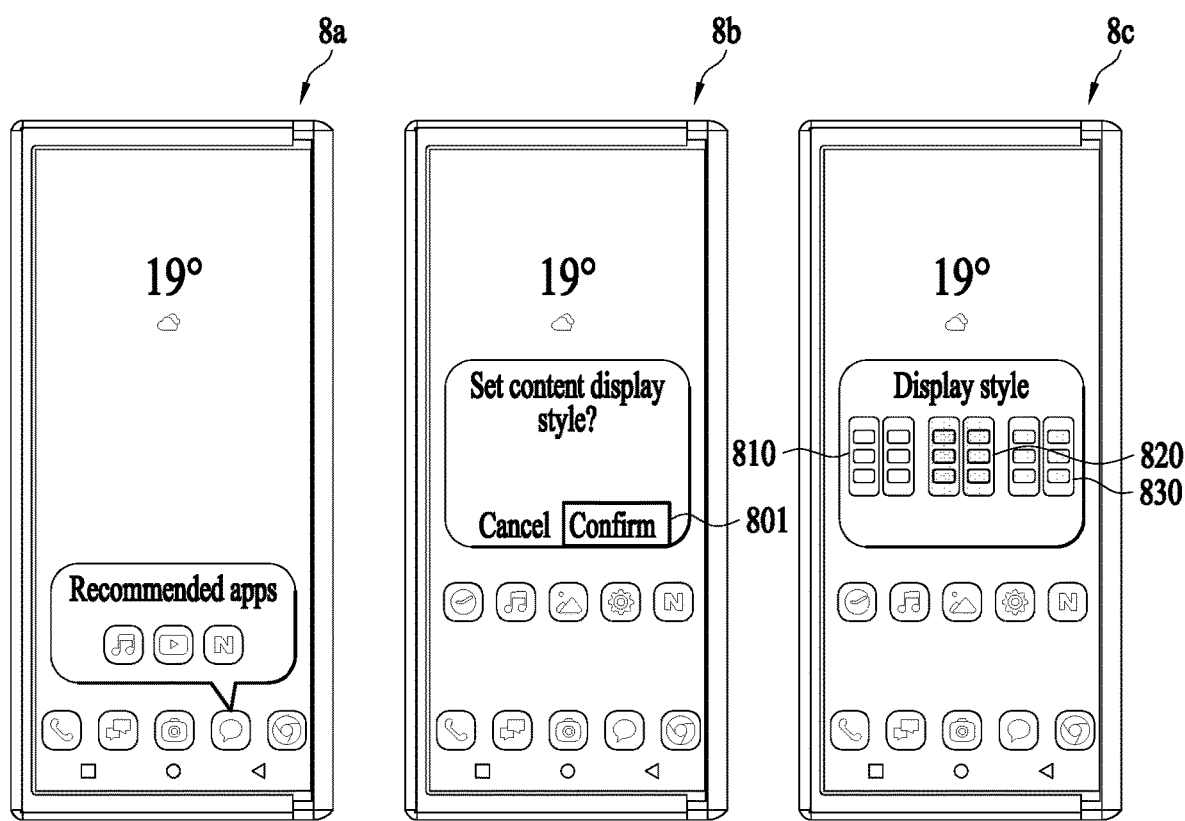
FIG. 8 is a diagram illustrating an example of a setting screen for a style of displaying content on an electronic device according to an example embodiment of the present disclosure.

FIG. 8 is a diagram illustrating an example of a setting screen for a style of displaying content on an electronic device according to an example embodiment of the present disclosure.

Reference numeral 8a may correspond to the reference numeral 6a of FIG. 6. As for this, since the reference has been made with FIG. 6, redundant descriptions will be omitted.

When an input for selecting at least one of the plurality of applications included in a selecting window of the reference numeral 8a is received, a screen may be displayed as indicated by reference numeral 8b. The reference numeral 8b may be a screen for requesting a verification of whether to set a style of displaying content related to a first application and content related to a second application. When an input to a confirm icon 801 is received, a screen may appear as indicated by reference numeral 8c.

According to the reference numeral 8c, the electronic device may provide information on a plurality of examples, that is, a first style 810, a second style 820, and a third style 830.

Here, the first style 810 may include, for example, a style of a light mode in which the display has a brightness of a predetermined value or more, that is, a light tone, or content is represented in a light color.

The second style 820 may include, for example, a style of a dark mode in which the display has a brightness less than the predetermined value, that is, a dark tone, or content is represented in a light color.

The third style 830 may include, for example, a style of applying at least one of the light mode and the dark mode based on a type of content represented on the display. Examples of the light mode and the dark mode will be described with reference to FIG. 9.

When an input corresponding to one of the first style 810, the second style 820, and the third style 830 is received, the electronic device may determine a style of displaying content on the display based on a style corresponding to the received input. Meanwhile, the examples of the style are not to be taken as being limited thereto, and changing a display form while maintaining content may be included in a style change.

Figure 9:
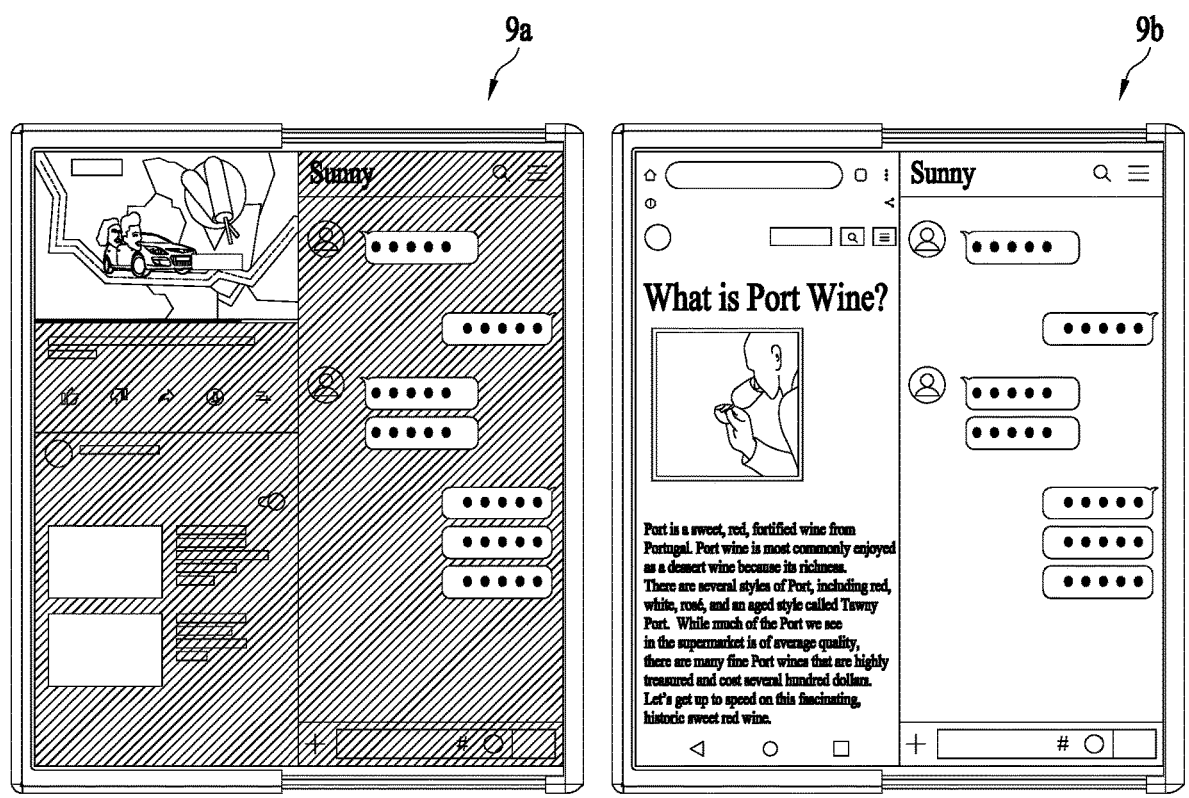
FIG. 9 is a diagram illustrating an example of a style of displaying content on an electronic device according to an example embodiment of the present disclosure.

FIG. 9 is a diagram illustrating an example of a style of displaying content on an electronic device according to an example embodiment of the present disclosure.

Reference numeral 9a indicates an example in which a style of displaying content on a display corresponds to a dark mode. Reference numeral 9b indicates an example in which a style of displaying content on the display corresponds to a light mode.

According to the reference numeral 9a, the dark mode may include a mode of overall decreasing a brightness of another portion distinguished from viewing content including a background so that the viewing content such as a video is more easily appreciated. In the dark mode, the content may be represented in dark-tone colors (e.g., black).

In the example embodiment, the example of the reference numeral 9a may appear in a case in which the second style 820 of FIG. 8 corresponding to the dark mode is set. In addition, the example of the reference numeral 9a may appear even in a case in which the third style 830 of FIG. 8 is set. This may be based on a case in which viewing-type content is included in content positioned in a left portion of the display, that is, because a content type is a viewing type.

According to the reference numeral 9a, the light mode may include a mode in which another portion distinguished from reading-type content including a background has a high brightness overall so that the reading-type content such as a text, that is, content requiring readability is easily used. In the light mode, the content may be represented in light-tone colors (e.g., white) overall.

In the example embodiment, the example of the reference numeral 9b may appear in a case in which the first style 810 of FIG. 8 corresponding to the light mode is set. In addition, the example of the reference numeral 9b may appear even in a case in which the third style 830 of FIG. 8 is set. This may be based on a case in which content of the display corresponds to the reading-type content, that is, because a content type is the reading type.

In other words, when reading-type contents such as news and a messenger are respectively arranged on the left and right as indicated by the reference numeral 9*b*, in response to the third style 830 being set, a style of displaying content on the display may be set to the light mode.

In addition, in the example embodiment, when first content corresponding to the first application and second content corresponding to the second application are displayed together, a style corresponding to the second application may be changed based on a style according to the setting of the first application.

Figure 10:
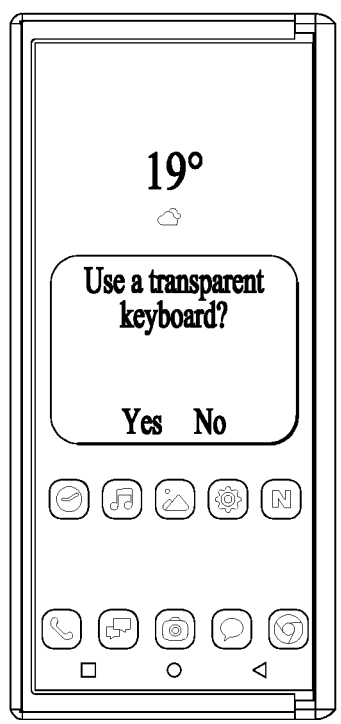
FIG. 10 is a diagram illustrating an example of a setting screen of an input user interface (UI) of an electronic device according to an example embodiment of the present disclosure.

FIG. 10 is a diagram illustrating an example of a setting screen of an input UI of an electronic device according to an example embodiment of the present disclosure.

Referring to FIG. 10, the electronic device may display a window for verifying whether to use an input UI. Specifically, the electronic device may display a text "Use a transparent keyboard?" on a display to verify whether to use an input UI having a transparency of a predetermined value or more.

In the example embodiment, the window of FIG. 10 may be provided in response to an application execution input being received. However, it is merely an example, and the window of FIG. 10 may be provided even in a setting operation for displaying a plurality of applications in parallel as described with reference to FIG. 6 or 8.

When an input corresponding to "yes" is received on the provided window, the electronic device may provide the input UI having the transparency of the predetermined value or more (e.g., the transparent keyboard, hereinafter referred to as a "transparent input UI"). The input UI may be provided in various ways. For example, when a type of content displayed on the display corresponds to a predetermined type, the transparent input UI may be provided. When a type of content displayed on the display does not correspond to a predetermined type, a general input UI (e.g., a general keyboard) may be provided.

Meanwhile, an example of providing the transparent input UI will be described in detail with reference to FIG. 11 and an example of providing the general input UI will be described in detail with reference to FIG. 12.

Figure 11:
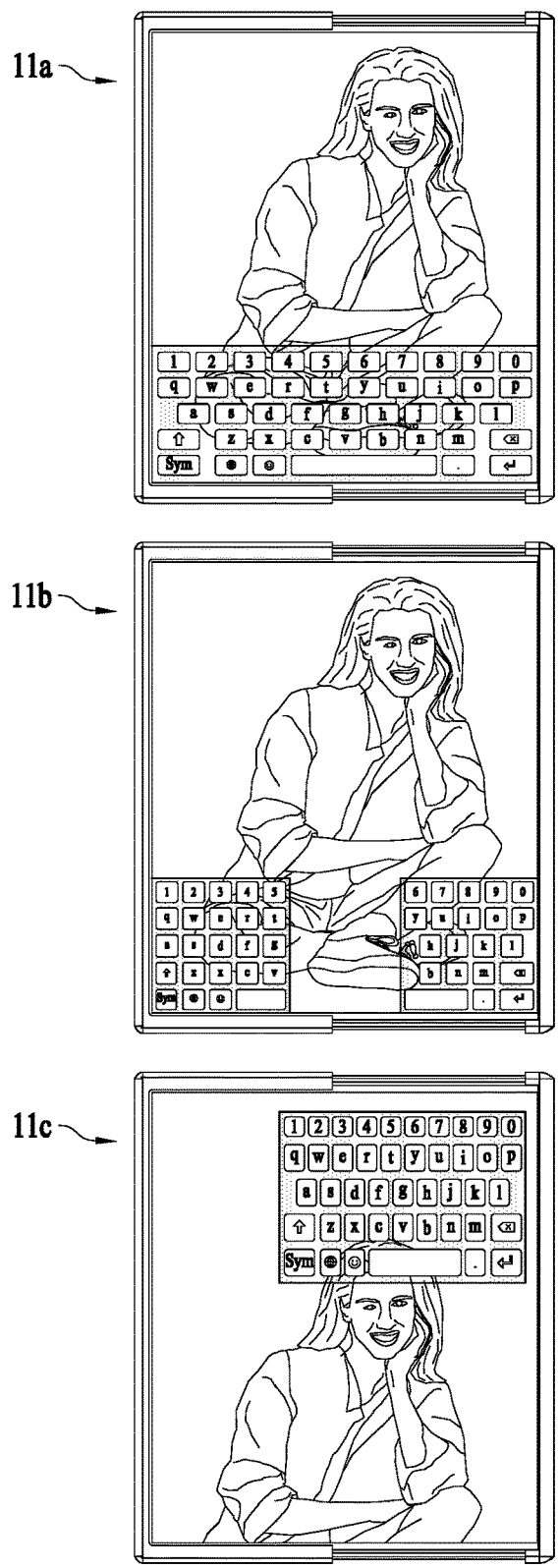
FIG. 11 is a diagram illustrating an example of an input UI of an electronic device according to an example embodiment of the present disclosure.

FIG. 11 is a diagram illustrating an example of an input UI of an electronic device according to an example embodiment of the present disclosure. Specifically, FIG. 11 illustrates an example of a case in which an input UI (hereinafter, referred to as a "transparent input UI") having a transparency of a predetermined or more.

According to reference numeral 11*a*, when video content corresponding to content of a first type (e.g., a viewing type) is displayed, the display may provide a transparent input UI having a transparency such that content positioned behind the input UI is seen through.

Specifically, the reference numeral 11*a* indicates a case in which the transparent input UI overlaps video content and is disposed on a lower portion of the video content to have a first size.

Meanwhile, the transparent input UI may be disposed in various forms. As an example, as indicated by reference numeral 11*b*, at least a portion and at least another portion of the transparent input UI may be disposed to be apart. As another example, as indicated by reference numeral 11*c*, the transparent input UI may be disposed on an upper portion of the display to have a second size. Here, the second size may correspond to a size less than the first size that is of the transparent input UI indicated by the reference numeral 11*a*, but it is merely an example.

Although FIG. 11 illustrates a state in which the display exposed to the first side of the electronic device is expanded in size as an example, the example is not to be taken as being limited thereto. In some cases, the transparent input UI may be displayed irrespective of the size of the display.

Figure 12:
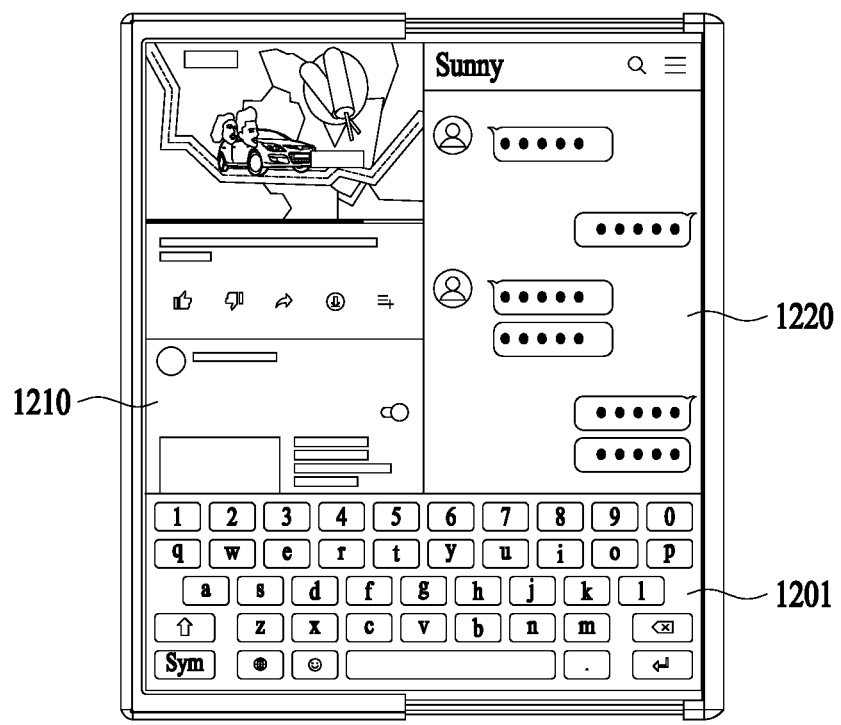
FIG. 12 is a diagram illustrating another example of an input UI of an electronic device according to an example embodiment of the present disclosure.

FIG. 12 is a diagram illustrating another example of an input UI of an electronic device according to an example embodiment of the present disclosure. Specifically, FIG. 12 illustrates an example of a case in which a general input UI is displayed.

Referring to FIG. 12, content of a first type related to a first application may be displayed in the first area 1210 of a display, and content of a second type related to a second application may be displayed in a second area 1220.

Here, the first type may be a viewing type and the second type may be a reading type. In this case, depending on an example embodiment, an input to the first area 1210 or an input to the second area 1220 may be applied.

For example, an input to the first area 1210 may include a touch input to content provided in the first area 1210 and an input to the second area 1220 may include a touch input to content provided in the second area 1220.

FIG. 12 illustrates a case in which an input UI 1201 having a transparency less than a predetermined value is displayed in response to the input to the second area 1220 being applied. That is, when the input to the second area 1220 is applied, based on a type of content corresponding to the second area 1220, the input UI 1201 corresponding to the type of content may be displayed. In this case, a type of the input UI for each type of content may be designated in advance.

Although not shown, when the input to the first area 1210 is applied, a transparent input UI having a transparency of the predetermined value or more may be displayed.

In the example embodiment, a screen of FIG. 12 may be a screen provided when it is set not to display the transparent input UI in a setting screen of FIG. 10. In this case, the input UI 1201 may be displayed irrespective of the type of content.

According to example embodiments of the present disclosure, an electronic device and a control method of the electronic device may display notification-related content or an input UI based on a type (e.g., a viewing type and a reading type) of application-related content or determine a style of displaying the application-related content. Through this, the application-related content may be used with increased ease and convenience.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

The invention claimed is:

1. An electronic device comprising:
 a display that is flexible, wherein the display has at least a portion located at a first side of the electronic device and the display is changeable in size; and a controller configured to:
> display a selecting window for selecting a second application among a plurality of recommended applications to be displayed in parallel with a first application,
> in response to selecting the second application, display a screen for setting a notification location, the screen including a first setting, a second setting, and a third setting,
> display content related to the first application in a first area of the display and display content related to the second application in a second area of the display,
> when a user selects one of the first application and the second application in a selecting window, display a screen for requesting verification of whether to set one of a first style, a second style and a third style of displaying content related to the selected one of the first application and the second application, and
> display content of the selected one of the first application and the second application according to the selected one of the first style, second style and third style,
> wherein the first setting displays the notification in the first area,
> wherein the second setting displays the notification in the second area different from the first area,
> wherein the third setting displays the notification based on a type of content of the first area and the second area,
> wherein the first style is a light mode of displaying the selected first or second application with a brightness of at least a predetermined value,
> wherein the second style is a dark mode of displaying the selected first or second application with a brightness of less than the predetermined value, and
> wherein the third style applies one of the light mode and the dark mode based on a type content of the selected first or second application.

2. The electronic device of claim 1, wherein the controller is configured to change a style of displaying the content related to the second application according to the content related to the first application.

3. The electronic device of claim 2, wherein the style of displaying the content related to the second application corresponds to a style of displaying the content related to the first application.

4. The electronic device of claim 2, wherein when an application displayed in the first area is changed to a third application, the controller is configured to identify a style of displaying the content related to the second application based on a style of displaying content related to the third application.

5. The electronic device of claim 1, wherein when an input related to displaying an input user interface (UI) is received, the controller is configured to identify the type of content related to the received input from the content related to the first application and the content related to the second application and display the input UI on the display at a transparency corresponding to the identified type of the content based on the input.

6. The electronic device of claim 1, wherein the controller is configured to identify an area in which an input UI is displayed in the display, and
> when at least a portion of the identified area is included in an area in which the content related to the first application is displayed, and when the content related to the first application corresponds to a predetermined type, the controller is configured to display the input UI in the identified area of the display at a transparency corresponding to the content type.

7. A control method of an electronic device comprising a display that is flexible, wherein the display has at least a portion located at a first side of the electronic device and the display is changeable in size, the control method comprising:
> displaying a selecting window for selecting a second application among a plurality of recommended applications to be displayed in parallel with a first application;
> in response to selecting the second application, displaying a screen for setting a notification location, the screen including a first setting, a second setting, and a third setting;
> displaying content related to the first application in a first area of the display and displaying content related to the second application in a second area of the display;
> when a user selects one of the first application and the second application in a selecting window, displaying a screen for requesting verification of whether to set one of a first style, a second style and a third style of displaying content related to the selected one of the first application and the second application; and
> displaying content of the selected one of the first application and the second application according to the selected one of the first style, second style and third style,
> wherein the first setting displays the notification in the first area,
> wherein the second setting displays the notification in the second area different from the first area,
> wherein the third setting displays the notification based on a type of content of the first area and the second area,
> wherein the first style is a light mode of displaying the selected first or second application with a brightness of at least a predetermined value,
> wherein the second style is a dark mode of displaying the selected first or second application with a brightness of less than the predetermined value, and
> wherein the third style applies one of the light mode and the dark mode based on a type content of the selected first or second application.

8. The control method of claim 7, further comprising:
> changing a style of displaying the content related to the second application according to the content related to the first application.

9. The control method of claim 8, wherein the style of displaying the content related to the second application corresponds to a style of displaying the content related to the first application.

10. The control method of claim 8, wherein when an application displayed in the first area is changed to a third application, the changing of the style comprises identifying a style of displaying the content related to the second application based on a style of displaying content related to the third application.

11. The control method of claim 7, further comprising:
> identifying, when an input related to displaying an input user interface (UI) is received, the type of content related to the received input from the content related to the first application and the content related to the second application; and
> displaying the input UI on the display at a transparency corresponding to the identified type of the content based on the input.

12. The control method of claim 7, further comprising:
identifying an area in which an input UI is displayed in the display; and
displaying, when at least a portion of the identified area is included in an area in which the content related to the first application is displayed, and when the content related to the first application corresponds to a predetermined type, the input UI in the identified area of the display at a transparency corresponding to the content type.

13. The electronic device of claim 1, wherein the screen for setting the notification location includes a first icon representing the first setting, a second icon representing the second setting and a third icon representing the third setting.

14. The control method of claim 7, wherein the screen for setting the notification location includes a first icon representing the first setting, a second icon representing the second setting and a third icon representing the third setting.

\* \* \* \* \*